US007063339B2

(12) United States Patent
Jarko et al.

(10) Patent No.: US 7,063,339 B2
(45) Date of Patent: Jun. 20, 2006

(54) LOAD DOLLY (76) Inventors: Paul R. Jarko, 18 Albert St., Stouffville, Ontario (CA) L4A 1B4; Scott William Andrew Dunsmoor, 241 Harold St., Stouffville, Ontario (CA) L4A 1C2; David B. Snaith, 225 Davisville Ave. Apt. 1715, Toronto, Ontario (CA) M4S 1G9

( * ) Notice: Subject to any disclaimer, the term of this patent is extended or adjusted under 35 U.S.C. 154(b) by 0 days.

(21) Appl. No.: 10/062,680

(22) Filed: Feb. 1, 2002

(65) Prior Publication Data
US 2003/0146589 A1 Aug. 7, 2003

(51) Int. Cl.
*B62B 1/26* (2006.01)

(52) U.S. Cl. ............... 280/47.19; 280/47.24; 280/47.28

(58) Field of Classification Search ........... 280/47.19, 280/47.24, 47.26, 47.27, 47.28, 47.34, 47.35, 280/79.11, 79.2, 79.3, 654; 224/411, 552, 224/533, 323; D34/12, 24, 27
See application file for complete search history.

(56) References Cited

U.S. PATENT DOCUMENTS

| | | | | |
|---|---|---|---|---|
| 2,673,671 A | * | 3/1954 | Williams | 280/47.35 |
| 2,940,707 A | * | 6/1960 | Bland et al. | 248/129 |
| 3,837,667 A | * | 9/1974 | Sernovitz | 280/47.35 |
| 4,037,851 A | * | 7/1977 | Romero | 280/79.2 |
| 4,319,762 A | * | 3/1982 | Streit et al. | 280/79.2 |
| 4,821,903 A | * | 4/1989 | Hayes | 280/47.34 |
| 5,230,282 A | * | 7/1993 | Barnes | 242/141 |
| 5,464,104 A | * | 11/1995 | McArthur | 280/79.3 |
| 5,707,030 A | * | 1/1998 | Roman | 280/654 |
| 5,820,143 A | * | 10/1998 | Rigo | 280/47.26 |
| 6,352,225 B1 | * | 3/2002 | Dooley et al. | 280/47.34 |
| 6,497,423 B1 | * | 12/2002 | Perelli et al. | 280/47.34 |
| 6,550,792 B1 | * | 4/2003 | Salmon et al. | 280/47.24 |

FOREIGN PATENT DOCUMENTS

| | | | | |
|---|---|---|---|---|
| CA | 2271906 | * | 9/2000 | |
| CH | 310381 | * | 12/1955 | 280/79.3 |
| DE | 317031 | * | 12/1919 | 280/47.35 |
| EP | 517 166 | * | 6/1992 | |
| EP | 0 955 224 | * | 3/1999 | |
| GB | 2025860 | * | 1/1980 | 280/79.3 |
| GB | 2319503 | * | 5/1998 | |

* cited by examiner

*Primary Examiner*—Frank Vanaman
(74) *Attorney, Agent, or Firm*—Sand & Sebolt (57) ABSTRACT

A wheeled dolly for storing and transporting a plurality of recycle boxes has an inverted U-shaped tubular frame and a pair of plastic shelves mounted on the frame and extending in a cantilever fashion therefrom. A lid is pivotally mounted on the frame for closing the open top of the top-most box. A metal mesh basket is mounted on the rear of the frame for receiving and storing paper products. A roll of cord is mounted on the lid for discharging a length of cord to tie the paper products into bundles. A cord cutter is mounted on the lid to cut the cord from the roll after it is tied about the paper products.

31 Claims, 8 Drawing Sheets

LOAD DOLLY

BACKGROUND OF THE INVENTION

1. Technical Field

The invention relates to wheeled load dollies for supporting and moving a plurality of containers and in particular, trash boxes for recyclable materials. Even more particularly, the invention relates to such a load dolly having a plurality of shelves, each of which is sized and adapted to hold a recycle box in a protective manner for ease of storage and transportation.

2. Background Information

Many municipalities supply the homeowner with recycle boxes, each of which is adapted to contain a certain type of material such as bottles in one box, plastic articles in another box, paper in a third box, etc. These boxes are usually kept at the occupant's house and when filled, are placed curbside on a selected day or days of the week for pickup by the sanitation workers.

Various types of dollies have been developed having various support means thereon for handling and transporting various loads from one location to the other. However, many of such dollies are relatively heavy, expensive, and not suitable for the recycle boxes and paper products.

BRIEF SUMMARY OF THE INVENTION

The present invention is a dolly for transporting a plurality of containers and in particular, recycle boxes on a plurality of shelves mounted on a metal wheeled frame.

One feature of the invention is to provide a metal mesh spring basket mounted on the rear of the frame for securely holding a plurality of paper products, such as newspapers, magazines, etc. which are subsequently bound with twine or cord after placement in the basket.

A further feature of the invention is to provide a lid pivotally mounted on an upper portion of the frame which is complementary to the size and shape of the upper-most recycle box for covering the open top of the box to prevent animals and rain from entering the box; in which this upper-most box provides protection for the lower box or boxes; and in which the shelves are provided with a plurality of openings to prevent the accumulation of water thereon.

An aspect of the invention is to provide a dolly in which the pivotally mounted lid has a holder for rotatably mounting a ball of twine or cord, and a cord cutter mounted in the lid to facilitate the tying of bundles of paper, magazines, etc., which are stored in the metal spring mesh basket mounted on the rear of the dolly frame.

Another aspect of the invention is to form the shelves and lid of lightweight plastic such as polypropylene, with the tubular frame being formed of metal which provides a weather resistant structure.

A further aspect of the invention is to size the dolly shelves to match the particular shape and configuration of the recycle boxes, and in which the shelves are formed with side walls and a slight front edge to retain and stabilize the boxes stored thereon and which will allow the boxes to be pulled forward from the shelves for adding materials to the boxes or emptying the contents therefrom.

Another feature is to provide the lid with an arcuate groove in the outside surface thereof for receiving an upper arcuate end of the tubular frame when the lid is in the open position to limit the opening movement of the lid as well as stabilizing the lid when in the open position.

Another benefit of the invention is providing the lid with a dome-shape to increase the storage capacity of the upper-most recycle box.

These features are obtained by the load dolly of the present invention which is intended for storing and transporting a plurality of containers, the general nature of which may be stated as comprising an upright frame having front and rear sides, wheels for moving the dolly; at least upper and lower support shelves mounted in a vertically spaced relativity on the frame and extending outwardly from the front side of the frame in a cantilever manner for supporting containers thereon, and a lid movably mounted on the frame providing a cover for a container supported on the upper shelf.

BRIEF DESCRIPTION OF THE DRAWINGS

A preferred embodiment of the invention, illustrative of the best mode in which applicant contemplates applying the principle, is set forth in the following description and is shown in the drawings and is particularly and distinctly pointed out and set forth in the appended claims.

Similar numerals refer to similar parts throughout the drawings.

DETAILED DESCRIPTION OF THE INVENTION

Figure 1:
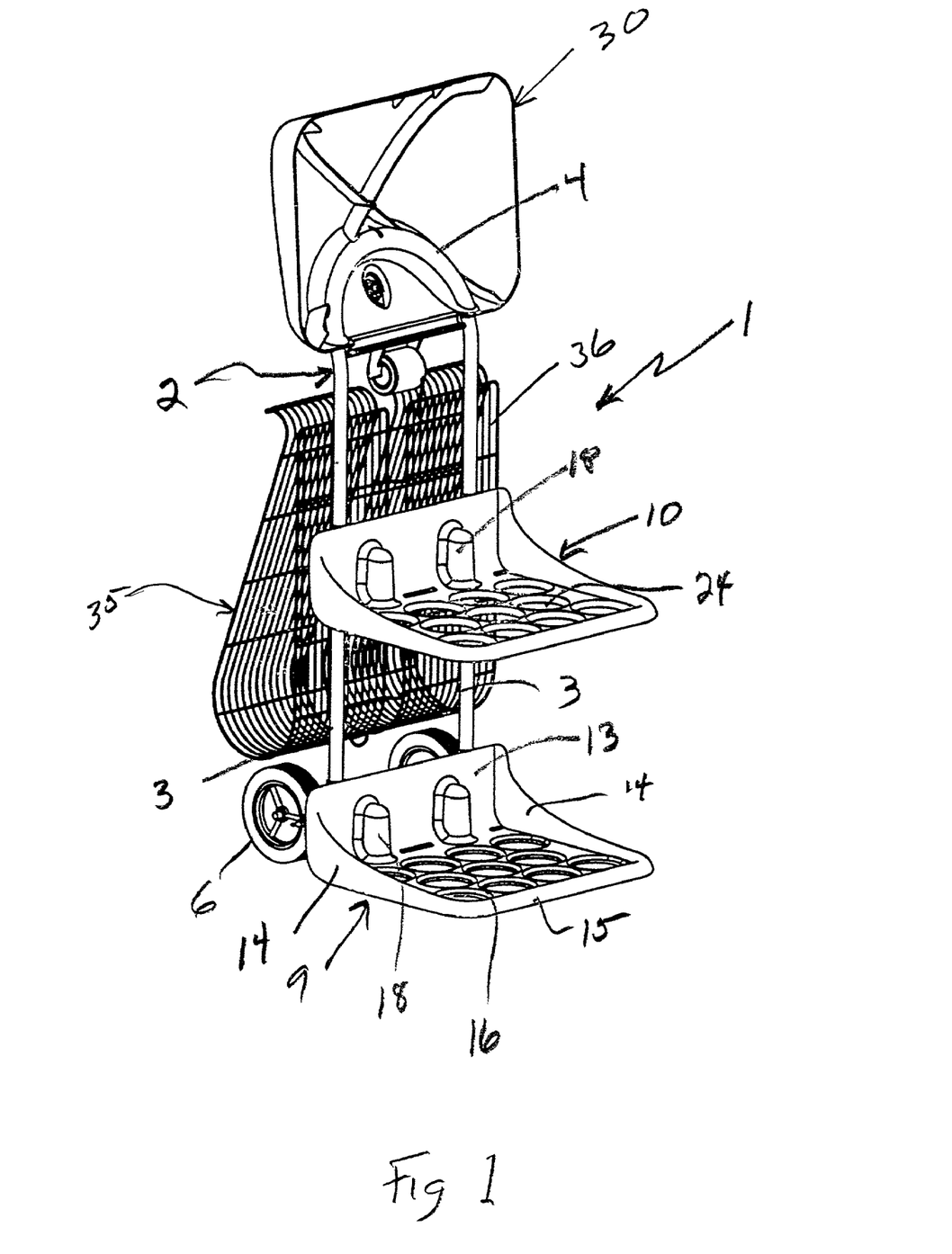
FIG. 1 is a front perspective view of the load dolly of the present invention.
Figure 4:
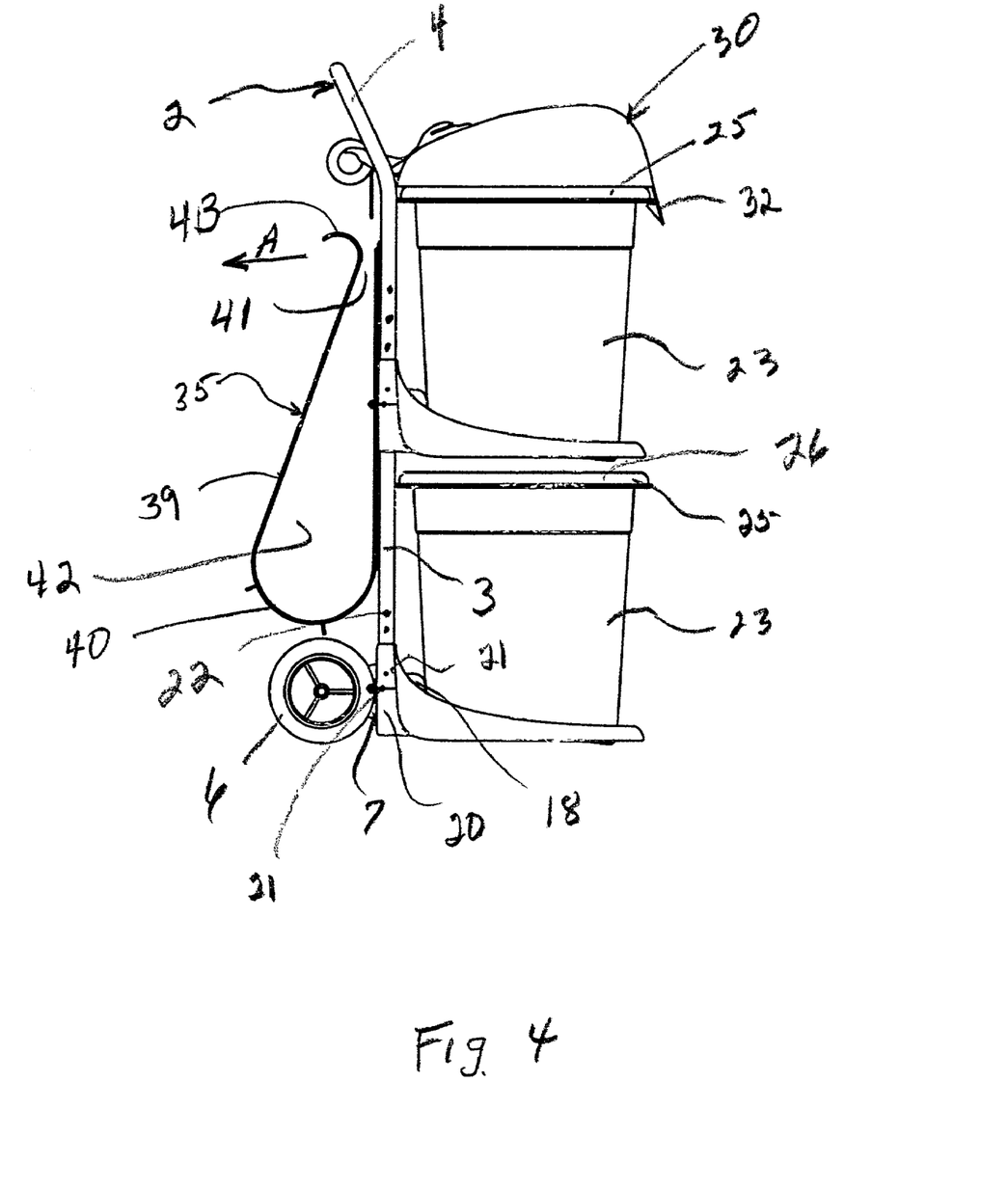
FIG. 4 is a side elevational view of FIG. 3.

The load dolly of the present invention is indicated generally at 1, and is shown in an unloaded condition in FIG. 1. Dolly 1 includes an upright frame indicated generally at 2, preferably formed of tubular metal which has an inverted U-shaped configuration with spaced parallel side frame members 3 and a U-shaped upper end 4 which is slightly angled in a rearward direction from side frame members 3, as shown in FIG. 4. A pair of wheels 6 are rotatably mounted at the bottom of each frame member 3 by a bracket 7 which extends outwardly therefrom as shown in FIG. 4. If desired, wheels 6 could be mounted on a common axle extending between frame members 3 or other type of rotatable mounting means.

In accordance with one of the features of the invention, a plurality of storage shelves, two of which are shown in the drawings and indicated generally at 9 and 10, are mounted on and extend between frame members 3. The shelves preferably are similar to each other to reduce the cost of manufacture and to enable them to be installed at any location along the frame. Each shelf preferably is molded of a plastic material such as polypropylene, and has a back wall 13, a pair of partial side walls 14, and a slightly raised front rim 15, all of which are formed integrally with a bottom wall 16. Side walls 14 have curved inner portions which merge into back wall 13. Shelves 9 and 10 are formed with a plurality of holes 24 in bottom wall 16 to prevent the accumulation of water and debris on the shelves. Partial side walls 14, together with front rim 15, assist in retaining boxes 23 in their stored position on shelves 9 and 10 with the front rim being low enough to enable the boxes to be slid relatively easy from the shelves for depositing the stored trash into the sanitary pick-up vehicle. A pair of projections 18 are formed on back wall 13 and extend outwardly therefrom, the purpose of which are discussed further below.

A pair of brackets 20 are formed integrally with back wall 13 of each shelf and extend outwardly therefrom as shown in FIG. 4. Brackets 20 are formed with a pair of holes 21 which align with selected pairs of holes 22 formed in frame members 3 for receiving a fastener therethrough for mounting shelves 9 and 10 on frame 2. If preferred, the fasteners may be removable pins or the like to enable the shelves to be readily adjustable along frame members 3. Likewise, the fasteners can be permanent rivets, screws, etc. for permanently securing the shelves in a fixed position on the frame.

The shelves extend outwardly from frame 2 in a cantilever fashion, and in accordance with the invention, provide storage areas and support for slidably receiving and retaining recycle boxes or container 23 thereon. As shown in FIG. 4, rear wall projections 18 position boxes 23 in the preferred location on the shelves so that upper rims 25 of the boxes are properly spaced from frame members 3.

Boxes 23 preferably are formed of a lightweight rigid plastic material and have a substantially rectangular parallelopiped configuration with a slight downward taper from the open top thereof the bottom as shown in FIG. 4. Each of the boxes is provided with an open top 26 for placing the particular trash, such as bottles, cans, plastic articles, into the boxes.

Figure 3:
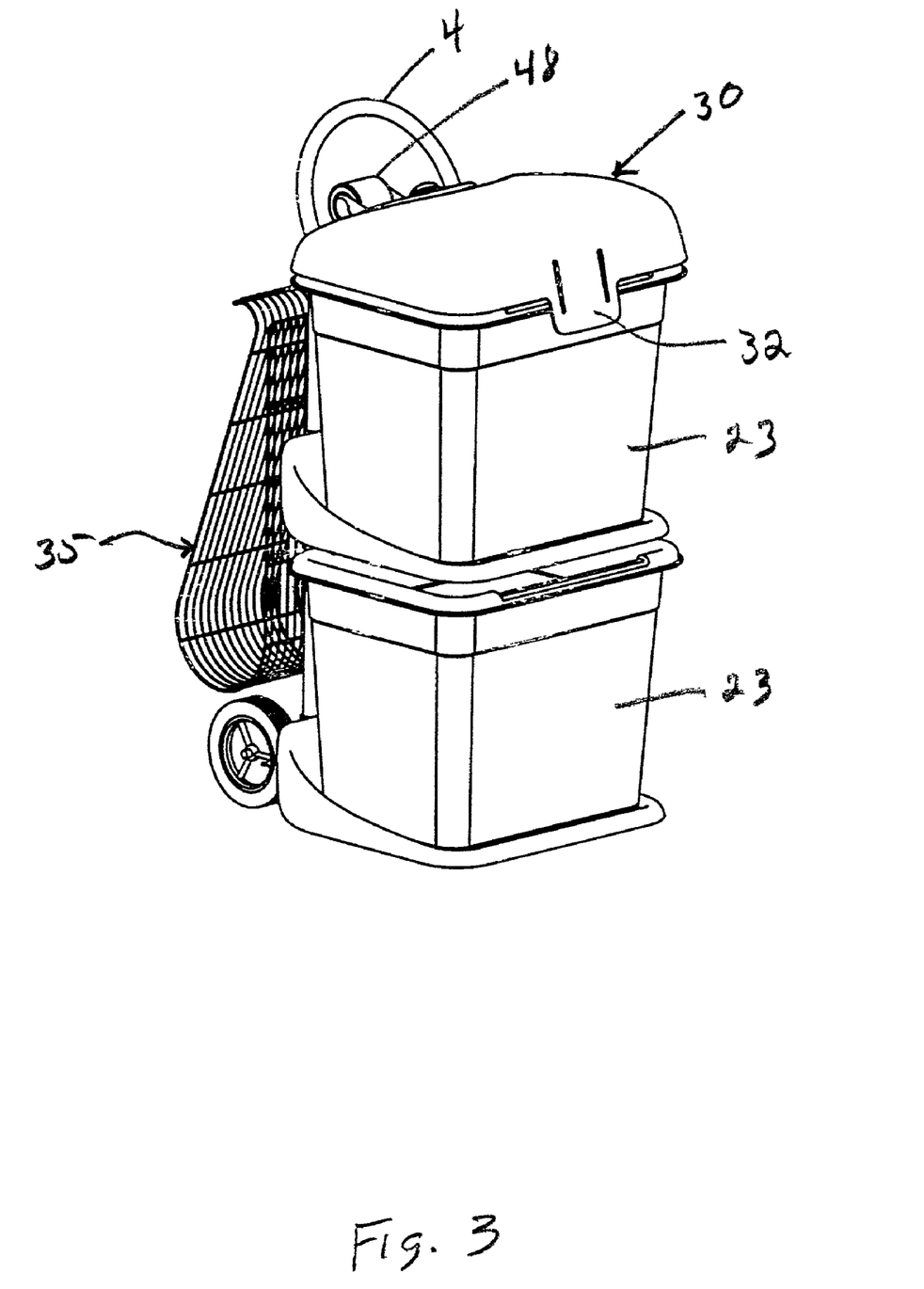
FIG. 3 is a perspective view similar to FIG. 2 with the lid in a closed, latched position.
Figure 5:
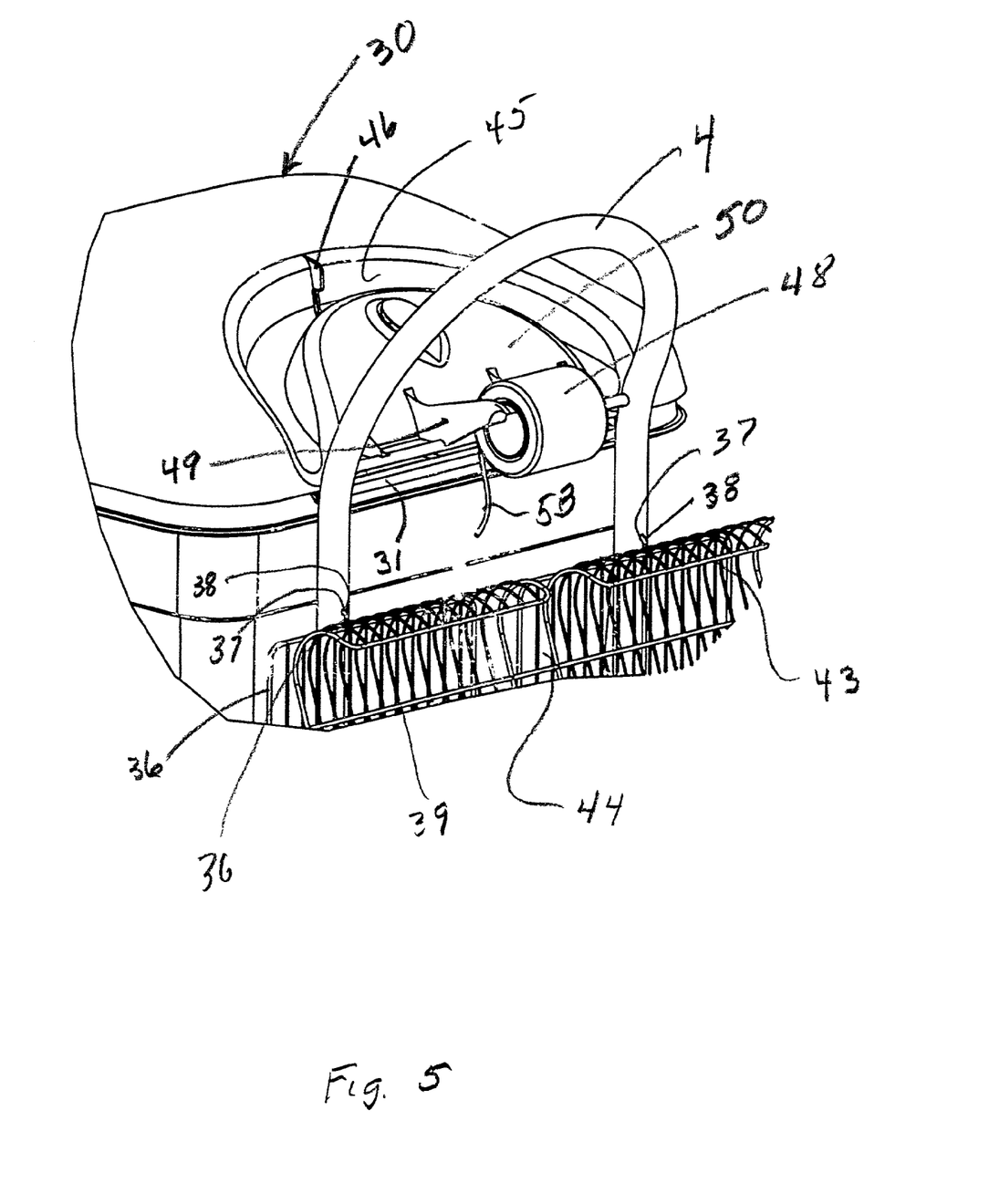
FIG. 5 is an enlarged fragmentary rear elevational view of the dolly lid in the closed position.
Figure 6:
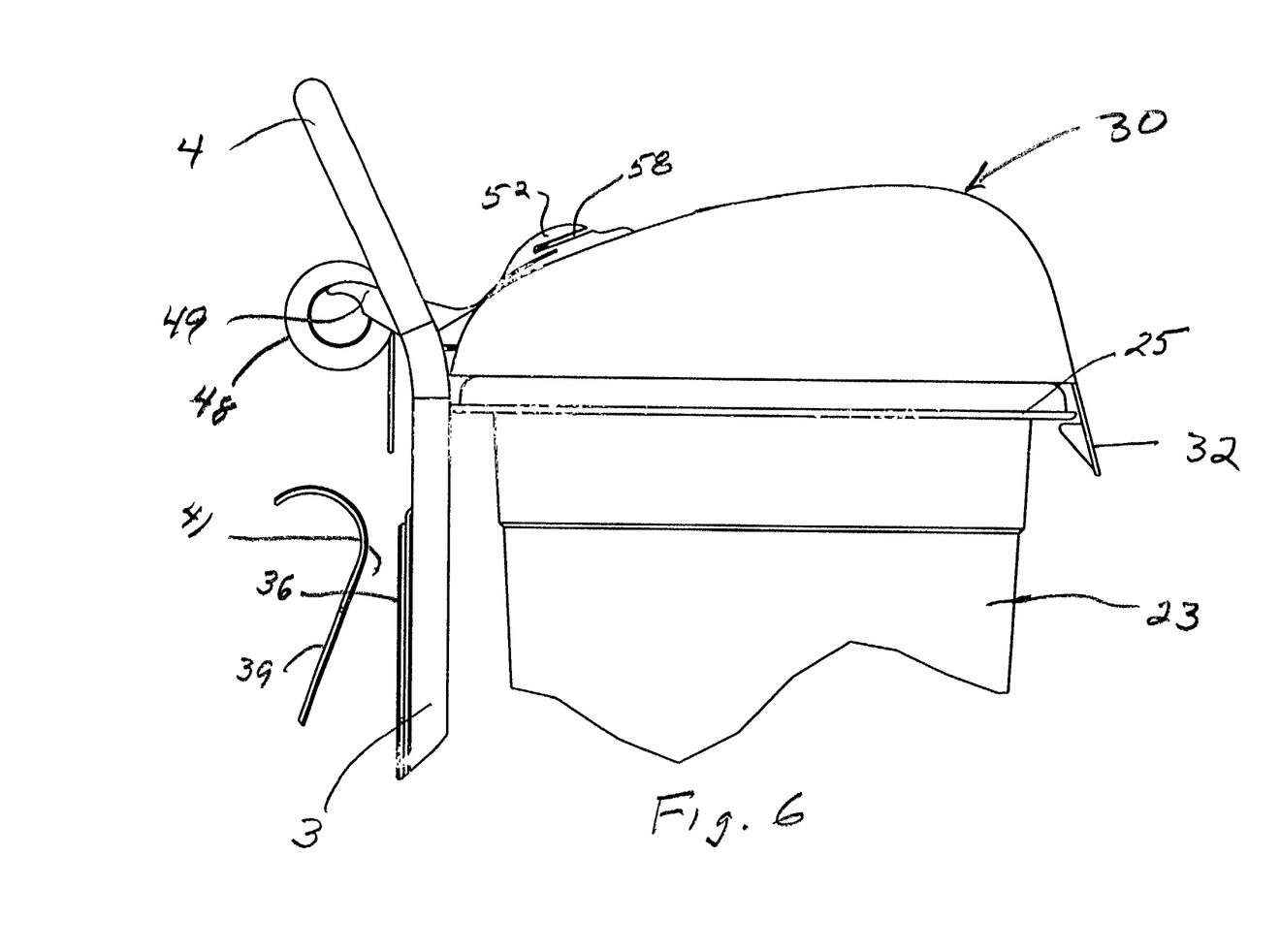
FIG. 6 is an enlarged side elevational view of the upper portion of the load dolly with the lid in the closed position.
Figure 7:
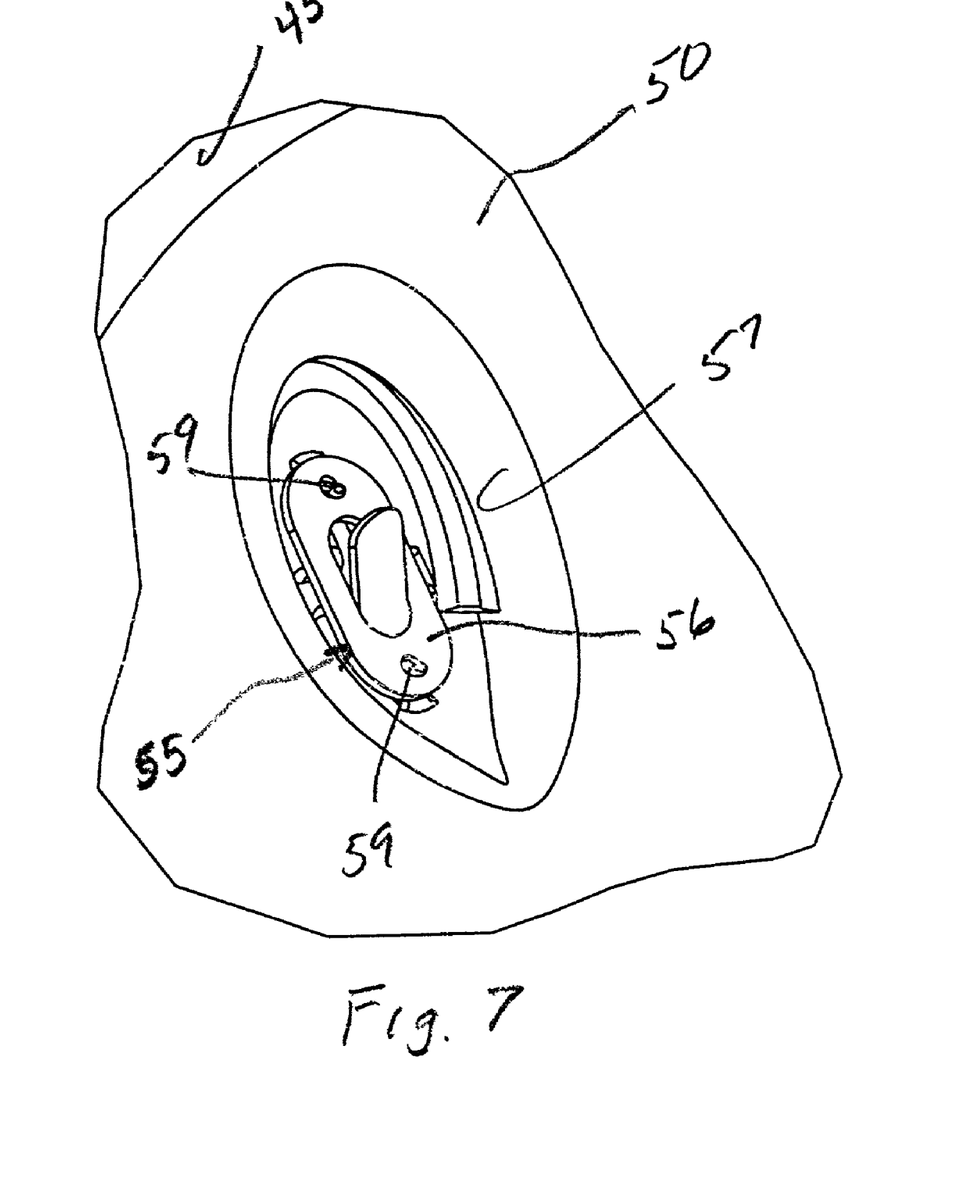
FIG. 7 is an enlarged fragmentary perspective view showing the lid mounted cord cutter.
Figure 8:
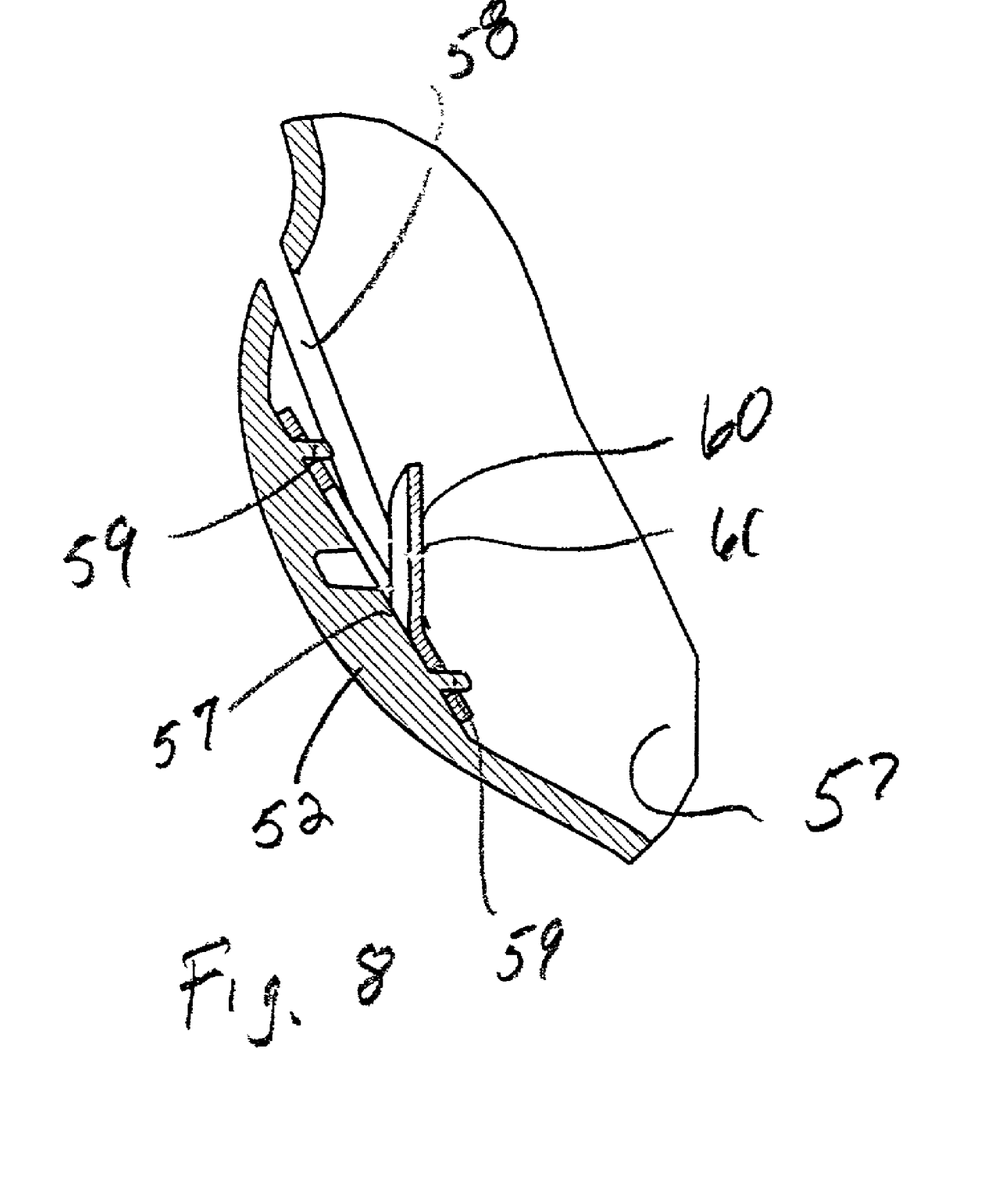
FIG. 8 is a sectional view of the cord cutter shown in FIG. 7.

In accordance with another feature of the invention, a lid indicated generally at 30, is pivotally mounted on a pivot rod 31 which extends between the upper ends of frame members 3 as shown in FIG. 5. Lid 30 preferably has a dome-shaped configuration providing additional storage space for materials placed in the box on upper shelf 10. A latch 32 is mounted on the front lid 30 which can be configured to clip over box rim 25 of the upper-most box as shown in FIGS. 3, 4, and 6 to prevent rain from entering the box as well as preventing the box from being scavaged by animals.

The upper shelf 10 is positioned so as to be slightly above the location of rim 25 of lower box 23 whereby upper box 23, shelf 10, and lid 30 provide weather and animal protection to lower box 23 by covering open top 26 thereof. Again, upper shelf 10 is positioned along frame members 3 to provide this desired spacing between the boxes and locating the upper end of the box with respect to lid 30.

In accordance with still another feature of the invention, a spring metal paper holder or basket indicated generally at 35, is mounted on the rear of frame 2 for storing paper products such as newspapers, magazines, collapsed cardboard boxes, etc. until picked up by sanitation workers. Basket 35 preferably is formed of a spring metal mesh material having a front wall 36 which extends along vertical frame members 3 and is secured thereto by a plurality of fasteners such as hooks 37, which extend into holes 38 formed in frame members 3 as shown in FIG. 5. Basket 35 has a partially collapsed U-shaped configuration as shown in FIG. 4. Additionally, basket 35 may be replaced by multiple baskets for retaining separate types of products, including newspapers, magazines, and collapsed cardboard boxes without departing from the spirit of the present invention.

In addition to front wall 36, basket 35 includes a rear wall 39 and a curved U-shaped bottom 40 which biases rear wall 39 toward front wall 36 to provide an expandable opening 41 therebetween for placement of papers, etc. into a storage compartment 42 formed between front and rear walls 36 and 39. Preferably, the upper end of basket rear wall 39 has a rearwardly curved upper end 43. Thus, by pulling outwardly on curved upper end 43 as shown by arrow A in FIG. 4, it will enlarge opening 41 for depositing the papers, etc. within storage compartment 42. A cord gap or slot 44 is formed in basket 35 and extends along front wall 36 and rear wall 39.

Although basket 35 is shown being formed of a metal mesh, other types of materials could be used for forming the paper storage area. However, the metal mesh is preferred because it is lightweight and provides the desired flexibility and strength.

Figure 2:
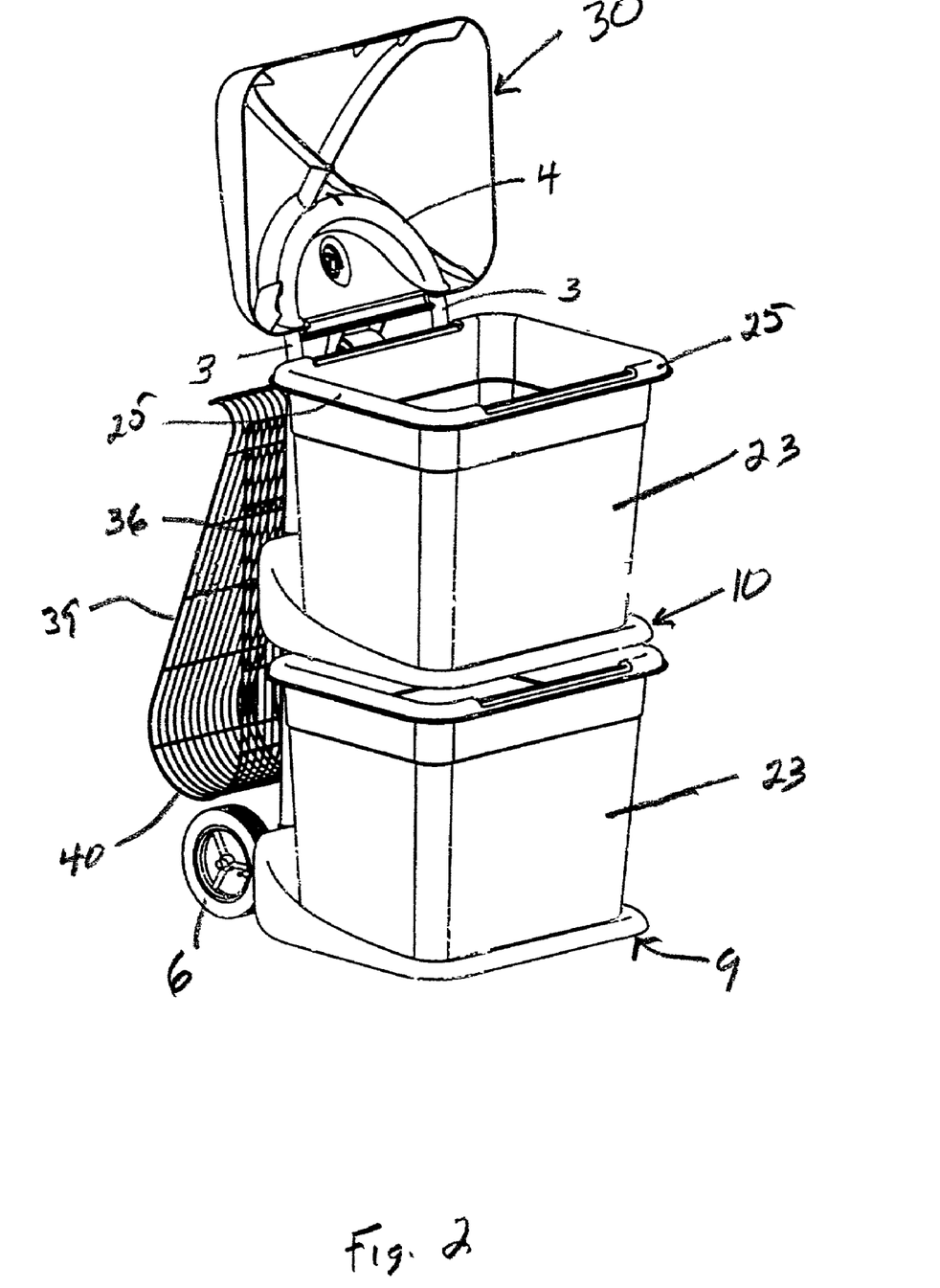
FIG. 2 is a front perspective view of the load dolly supporting two recycle boxes with the lid in the open position.

As shown in FIG. 5, lid 30 is formed with a U-shaped recess 45 in the outer surface thereof which is complementary to U-shaped top 4 of frame 2 and receives frame end 4 therein when lid 30 is in an open position as shown in FIGS. 1 and 2. A flexible latch 46 may be mounted or formed on lid 30 and projects into groove 45 for removably engaging upper frame end 4 to retain the lid in a temporary open position.

Some municipalities require that the paper products be placed in bundles and secured by a cord. Thus, in accordance with another feature of the invention, a roll of cord or twine 48 is rotatably mounted between a pair of spaced brackets 49 on lid 30. Brackets 49 are mounted on and extend outwardly from a generally semicircular area 50 of lid 30 defined by U-shaped recess 45 (FIG. 5). Thus, the occupant unwinds a length of cord from roll 48 and places it through slot 44 formed on the front and rear walls of basket 35 and when the basket is full, will pull the cord upwardly to the top of the dolly and tie the cord to itself to bind the papers into a secure bundle. To further facilitate this bundling feature, a cutter mechanism indicated generally at 55, is mounted in semicircular area 50 of lid 3 (FIGS. 5–8).

Cutter mechanism 55 is formed of an oval-shaped piece of metal 56 which is secured to the inside surface 57 of a small dome-shaped portion 52 of lid area 50 by a pair of fasteners 59. Cutter 55 has an inwardly projecting cutting tongue 60 (FIGS. 7 and 8) formed from metal 56. A slot 58 is formed in domed portion 52 to provide access to cutting tongue 60.

Therefore, after the desired amount of paper which has been stored in basket 35 and the occupant has tied the cord off on itself, the cord is passed through cutter slot 58 and against an edge 61 of tongue 60 which is sufficiently sharp to sever the cord from the roll. Thus, the bundled paper products remain in basket 35 until removed curbside.

Accordingly, dolly 1 provides a relatively inexpensive, lightweight device for storing of recycle boxes which are protected from the weather and marauding animals and which can be wheeled easily to curbside for removal of the boxes therefrom for subsequent pickup.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A dolly for transporting a plurality of containers, said dolly comprising:

a frame formed of tubular metal having an inverted U-shape with a pair of vertically extending side members and a curved end extending between said side members, and having front and rear sides;

wheels for moving the dolly;

at least upper and lower support shelves mounted in a spaced relationship on the frame and extending outwardly from the front side of the frame in a cantilever manner for supporting containers thereon; and a lid movably mounted on the frame providing a cover for a container supported on the upper shelf, said lid having an arcuate groove formed therein complementary to the curved end of the frame.

2. The dolly as defined in claim 1 wherein at least one basket is mounted on the rear side of the frame and extends downwardly along said frame.

3. The dolly as defined in claim 2 wherein the basket is a generally U-shaped metal mesh screen.

4. The dolly as defined in claim 1 wherein the upper and lower shelves have upwardly extending side walls and a back wall.

5. The dolly as defined in claim 4 wherein projections are formed on the back wall to assist in positioning the containers on the shelves.

6. The dolly as defined in claim 1 wherein the shelves are molded of plastic.

7. The dolly as defined in claim 1 further including a cord holder thereon.

8. The dolly as defined in claim 7 wherein the cord holder is mounted on the lid.

9. The dolly as defined in claim 8 wherein a cutting mechanism is mounted on the lid adapted for cutting a cord.

10. The dolly as defined in claim 1 wherein a cutting mechanism is mounted thereon.

11. A combination comprising a plurality of rigid containers and a dolly for removably holding and transporting said containers, each of said containers being substantially rectangular parallelopiped with a top opening; said dolly having an upright frame with at least upper and lower support shelves mounted in a stacked spaced vertical aligned relationship thereon for slidably receiving and supporting the containers thereon, said shelves having open fronts for horizontally removing and placing the containers thereon; a lid mounted on the frame and movable between open and closed position, said lid being complementary in shape and size to the top opening of the container supported on the upper support shelf, said upper support shelf having upwardly extending side walls, a back wall, and a front rim for positioning the base of the container on the upper support shelf whereby said lid selectively matingly engages and closes the top opening of the container mounted on the upper support shelf when the lid is in a closed position with the top opening of the container.

12. The combination as defined in claim 11 wherein the lid is dome-shaped and has a latch adapted to engage the container placed on the upper support shelf.

13. The combination defined in claim 11 wherein the dolly has an inverted U-shaped frame formed of tubular metal; and in which the shelves and containers are formed of plastic.

14. The combination as defined in claim 13 wherein the plastic is polypropylene.

15. The combination defined in claim 11 wherein a pair of wheels are mounted on the frame for movably mounting the dolly.

16. The combination defined in claim 15 wherein a receptacle is mounted on and extends downwardly along an opposite side of the frame from the shelves.

17. The combination defined in claim 16 wherein the receptacle is formed of a U-shaped metal mesh screen.

18. The combination as defined in claim 17 wherein the receptacle has a substantially straight first side extending along the frame, a curved bottom, and a second side terminating in a top end, said second side being biased toward the first side by the curvature of the bottom.

19. The combination as defined in claim 18 wherein the top end of the second side of the receptacle terminates in an outwardly curved configuration.

20. The combination as defined in claim 18 wherein a slot is formed on the first and second sides of the receptacle adapted to receive a cord therethrough.

21. The combination defined in claim 11 wherein a cord holder and cutter mechanism is mounted on the lid.

22. The combination defined in claim 21 wherein the cutter mechanism includes a cutting tongue located within the lid; and in which an access slot is formed in the lid to provide access for a cord to the cutting blade for severing a length of cord from the cord holder.

23. The combination defined in claim 22 wherein the lid includes a dome-shaped portion; in which the cutting tongue is located within said dome; and in which the slot is formed in the dome to provide access to the cutting tongue.

24. The combination as defined in claim 22 wherein mounting brackets extend outwardly from the back wall of the shelves; and in which fasteners secure the brackets to the upright frame to mount said shelves on the frame.

25. The combination as defined in claim 22 wherein the side walls have curved portions which merge into the back wall.

26. The combination defined in claim 11 wherein the containers have a bottom wall and a plurality of sidewalls tapered inwardly downwardly from the top opening to said bottom wall.

27. The combination defined in claim 11 wherein a latch is formed on the lid and configured to clip over a rim defining the top opening of the uppermost container.

28. The combination as defined in claim 27 wherein projections are formed on the back wall to engage a back wall of the container to assist in positioning the container on the upper support shelf so that the lid properly engages the rim of the container.

29. The combination as defined in claim 11 whereby the side walls of the upper support shelf extend only partially upwardly along the container supported thereon.

30. The combination as defined in claim 11 wherein the upper and lower shelves are formed with a plurality of drainage holes.

31. The combination as defined in claim 11 wherein a plurality of holes are formed on a pair of side frame members for adjustably mounting at least the uppermost shelf thereon.

\* \* \* \* \*